(12) United States Patent
Buradagunta et al.

(10) Patent No.: US 12,131,314 B2
(45) Date of Patent: *Oct. 29, 2024

(54) METHOD AND SYSTEM FOR ENABLING COMMUNICATION BETWEEN BLOCKCHAINS ON HETEROGENEOUS BLOCKCHAIN NETWORKS

(71) Applicant: Mastercard International Incorporated, Purchase, NY (US)

(72) Inventors: Sarala Buradagunta, West Orange, NJ (US); Rakesh Yadav, Cape Elizabeth, ME (US); Dmytro Kryvoshei, Edison, NJ (US); Steven C. Davis, Saint Peters, MO (US); Sébastien Le Callonnec, Greystones (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,152

(22) Filed: Oct. 3, 2023

(65) Prior Publication Data

US 2024/0029055 A1 Jan. 25, 2024

Related U.S. Application Data

(63) Continuation of application No. 16/705,825, filed on Dec. 6, 2019, now Pat. No. 11,816,662.

(51) Int. Cl.
*G06Q 20/36* (2012.01)
*G06N 20/00* (2019.01)
(Continued)

(52) U.S. Cl.
CPC ......... *G06Q 20/3674* (2013.01); *G06N 20/00* (2019.01); *H04L 9/0637* (2013.01); *H04L 9/0643* (2013.01); *H04L 67/133* (2022.05)

(58) Field of Classification Search
CPC ............... G06Q 20/3674; G06Q 20/02; G06Q 20/4014; G06Q 2220/00; G06N 20/00;
(Continued)

(56) References Cited

U.S. PATENT DOCUMENTS

| | | | |
|---|---|---|---|
| 6,070,196 A | 5/2000 | Mullen, Jr. | |
| 6,208,904 B1 | 3/2001 | Mullen, Jr. | |

(Continued)

FOREIGN PATENT DOCUMENTS

| | | | | |
|---|---|---|---|---|
| CN | 110266655 A | | 9/2019 | |
| KR | 20190132047 A | * | 1/2019 | ......... G06Q 20/3678 |

(Continued)

OTHER PUBLICATIONS

Sharma "Could Blockchain Replace DNS?", retrieved from https://www.blockchain-council.org/blockchain/blockchain-replace-dns/, Mar. 24, 2018, 10 pages (Year: 2018).*

(Continued)

*Primary Examiner* — James D Nigh
(74) *Attorney, Agent, or Firm* — Panitch Schwarze Belisario & Nadel LLP

(57) ABSTRACT

A system for enabling communication between blockchains on heterogeneous blockchain networks. The system can include a sending blockchain network comprised of a sending blockchain that includes a plurality of blocks, each block including a block header and one or more transaction values associated with an identification request transmitted by the sending blockchain. The system can include a directory service node configured to receive the identification request from the sending blockchain, and identify a receiving blockchain, which forms part of a receiving blockchain network. The system can include an identity service node configured to receive a trust request from the directory service node to determine whether a valid trust certificate is available for the (Continued)

receiving blockchain, and enable communication between the sending blockchain and the receiving blockchain, when the valid trust certificate is determined to be available.

16 Claims, 5 Drawing Sheets

(51) Int. Cl.
*H04L 9/06* (2006.01)
*H04L 67/133* (2022.01)
*G06N 3/084* (2023.01)
*G06N 20/10* (2019.01)
*G06Q 20/02* (2012.01)
*G06Q 20/40* (2012.01)
*H04L 9/00* (2022.01)
*H04L 9/32* (2006.01)

(58) Field of Classification Search
CPC ...... G06N 20/10; G06N 3/084; H04L 9/0637; H04L 9/0643; H04L 9/3263; H04L 9/3297; H04L 9/3239; H04L 67/133; H04L 2209/56
USPC .......................................................... 705/67
See application file for complete search history.

(56) References Cited

U.S. PATENT DOCUMENTS

| | | |
|---|---|---|
| 6,327,581 B1 | 12/2001 | Platt |
| 6,732,175 B1 | 5/2004 | Abjanic |
| 7,146,422 B1 | 12/2006 | Marlatt et al. |
| 7,512,711 B1 | 3/2009 | Abjanic et al. |
| 7,594,033 B2 | 9/2009 | Abjanic et al. |
| 7,966,012 B2 | 6/2011 | Parker |
| 10,095,992 B1 | 10/2018 | Brestoff et al. |
| 11,507,562 B1* | 11/2022 | Luedtke .................... H04L 9/50 |
| 2004/0184479 A1 | 9/2004 | Yamauchi et al. |
| 2017/0293503 A1 | 10/2017 | Curtis |
| 2017/0330179 A1* | 11/2017 | Song .................. G06Q 20/3823 |
| 2019/0036711 A1* | 1/2019 | Qiu ....................... H04L 9/3268 |
| 2019/0058581 A1 | 2/2019 | Wood et al. |
| 2019/0236606 A1 | 8/2019 | Padmanabhan et al. |
| 2019/0244306 A1 | 8/2019 | Kursun |
| 2019/0295114 A1* | 9/2019 | Pavletic ................ G06F 18/214 |
| 2019/0327082 A1* | 10/2019 | Ow ........................ G06N 5/022 |
| 2019/0340267 A1 | 11/2019 | Vo et al. |
| 2019/0384627 A1* | 12/2019 | De Caro ............ G06Q 10/0639 |
| 2020/0005292 A1 | 1/2020 | Mao et al. |
| 2020/0177572 A1 | 6/2020 | Qui |
| 2020/0267020 A1 | 8/2020 | Doney et al. |
| 2021/0014060 A1* | 1/2021 | Georgiadis ......... G06Q 20/3829 |
| 2021/0036855 A1 | 2/2021 | Kleniewski et al. |
| 2021/0105142 A1 | 4/2021 | Lee et al. |
| 2021/0144012 A1* | 5/2021 | Ghanea-Hercock ........................ H04L 9/3073 |
| 2021/0243032 A1* | 8/2021 | Qiu ....................... H04L 9/3239 |
| 2022/0027491 A1* | 1/2022 | Wright .................. H04L 9/3247 |

FOREIGN PATENT DOCUMENTS

| | | | |
|---|---|---|---|
| WO | 2019087119 A1 | 5/2019 | |
| WO | 2019185145 A1 | 10/2019 | |
| WO | 20200059893 A1 | 3/2020 | |

OTHER PUBLICATIONS

Translation of Korean Patent No. 20190132047, published on Nov. 27, 2019 and filed May 18, 2018, 28 pages (Year: 2019).*
Notification of Transmittal of the International Search Report (Forms PCT/ISA/220 and PCT/ISA/210) and the Written Opinion of the International Searching Authority (Forms PCT/ISA/237) issued Mar. 3, 2021, by the International Application Division Korean Intellectual Property Office in corresponding International Application No. PCT/US2020/060149 (10 pages).
Mazur, "A Step by Step by Step Backpropagation Example", https://mattmazur.com/2015/03/17/a-step-by-step-backpropagationexample/, retrieved on Dec. 5, 2019, 9 pages.
Notification of Transmittal of the International Search Report (Forms ISA/220 and PCT/ISA/210) and the Written Opinion of the International Searching Authority (Form PCT/ISA/237) issued on Mar. 5, 2021, by the International Application Diviison Korean Intellectual Property Office in corresponding International Application No. PCT/US2020/060161 (8 pages).
Office Action issued on Mar. 10, 2023, in corresponding U.S. Appl. No. 16/705,882, 36 pps.
KR20190132159A Method for Providing Cryptocurrency Trading Platform based on Blockchain by using Smart Contract IP.com translation (Year: 2019).
Office Action dated Apr. 14, 2023, issued in related U.S. Appl. No. 16/705,825, 37 pps.
Notice of Allowance, dated Jul. 6, 2023, issued in U.S. Appl. No. 16/705,825, 16 pgs.
Office Action, dated Aug. 7, 2023, issued in corresponding U.S. Appl. No. 16/705,882, 29 pgs.
Notice of Allowance, dated Dec. 12, 2023, issued in U.S. Appl. No. 16/705,882, 30 pages.
The Extended European Search Report dated Nov. 27, 2023, issued by the European Patent Office corresponding to European Patent Application No. 20896601.0 (35 Pages).
Matthew Spoke et al, "AION White Paper", Jul. 31, 2017, pp. 1-23, XP055478571, Retrieved from the Internet: URL:https://aion.network/media/en-aion-network-technicalintroduction. pdf [retrieved on May 25, 2018].
Stefan Thomas et al, "A Protocol for Interledger Payments", Feb. 9, 2016, XP055393555, Retrieved from the Internet: URL:https://interledger.org/interledger.pdf [retrieved on Jul. 25, 2017].

* cited by examiner

METHOD AND SYSTEM FOR ENABLING COMMUNICATION BETWEEN BLOCKCHAINS ON HETEROGENEOUS BLOCKCHAIN NETWORKS

FIELD

The present disclosure relates to enabling communication between blockchains on heterogeneous blockchain networks.

BACKGROUND

The number of blockchains, such as banks or other financial institutions operating on blockchain networks has grown at a rapid pace in the last decade. However, these blockchain networks remain isolated, operating in their own respective silos. Many heterogeneous blockchain networks are unable to communicate with each other, such as because of the use of different communication protocols, formatting standards, etc.

In some cases, if a blockchain network attempts to retrieve information from an external (outside the blockchain) source, each node in the blockchain network would have to perform the operation. But in such cases, because each node acts individually and an external source (e.g., a heterogeneous blockchain network) is used, there is no guarantee that each node will receive the same answer from the external source. This lack of homogeneity can break the consensus and therefore render the blockchain invalid.

The present disclosure provides technical solutions to the aforementioned technical problems of blockchain interoperability.

SUMMARY

The present disclosure provides a description of exemplary systems and methods to allow blockchains (e.g., blockchain based banks) on multiple heterogeneous blockchain networks to discover each other and establish a trusted connection to enable communication (e.g., payment flows) between the blockchains. Once a communication channel between the blockchains is established, it allows the blockchains to communicate with each other and perform an end-to-end payment flow despite their different messaging formats.

The system can include a sending blockchain network comprised of a sending blockchain that includes a plurality of blocks, each block including a block header and one or more transaction values associated with an identification request transmitted by the sending blockchain. The system can include a directory service node configured to receive the identification request from the sending blockchain, and identify a receiving blockchain, which forms part of a receiving blockchain network. The system can include an identity service node configured to receive a trust request from the directory service node to determine whether a valid trust certificate is available for the receiving blockchain, and enable communication between the sending blockchain and the receiving blockchain, when the valid trust certificate is determined to be available.

The method can include transmitting an identification request from a sending blockchain to a directory service node, wherein the sending blockchain includes a plurality of blocks, each block including a block header and one or more transaction values associated with the identification request, and the sending blockchain forms a part of a sending blockchain network. The method can include identifying, via the directory service node, a receiving blockchain that forms part of a receiving blockchain network. The method can include receiving, at an identity service node, a trust request from the directory service node to determine whether a valid trust certificate is available for the receiving blockchain. The method can include enabling communication between the sending blockchain and the receiving blockchain, when the valid trust certificate is determined to be available.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency or other data storage that may, in some case, not be related to financial transactions or other data transactions. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network.

In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Figure 1:
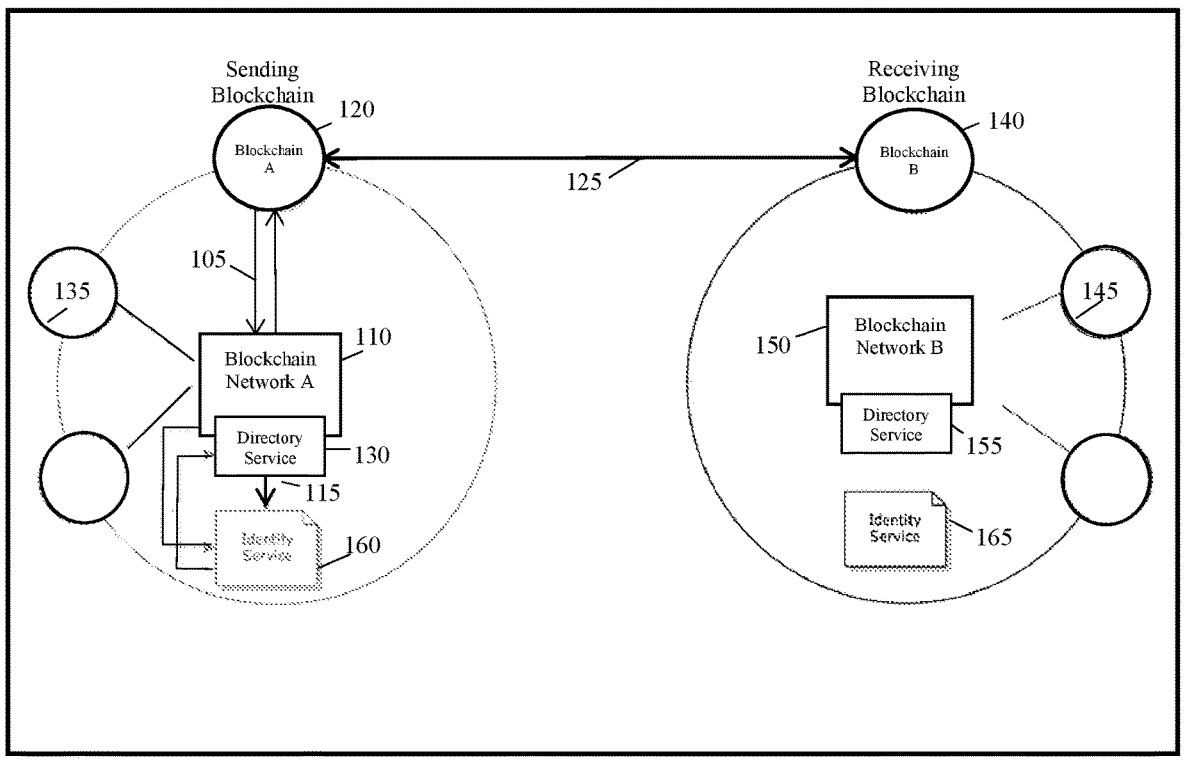
FIG. 1 illustrates a system for enabling communication between blockchains on heterogeneous blockchain networks in accordance with exemplary embodiments.

System and Method for Enabling Communication Between Blockchains on Heterogeneous Blockchain Networks FIG. 1 illustrates an exemplary system 100 for enabling communication between blockchains on heterogeneous blockchain networks. Heterogeneous blockchain networks, as used herein, can be any two or more blockchain networks with different layers, which may differ in the implementation of the networking, consensus, and application parts of the blockchain. Additionally, each of the heterogeneous blockchain networks can have their own validators that decide on the next block to commit to the blockchain.

In an exemplary embodiment, the system 100 can include a sending blockchain network 110 (e.g., blockchain network A) comprised of at least one sending blockchain (e.g., 120), and at least one node that may be a computing system configured to perform functions related to the processing and management of the blockchain, including the generation of blockchain data values, verification of proposed blockchain transactions, verification of digital signatures, generation of new blocks, validation of new blocks, and maintenance of a copy of the blockchain.

A blockchain, as used herein, can include various types of entities such as banks, financial institutions, or other nodes that at least partially operate on a blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.).

The block reference value may be a value that references an earlier block (e.g., based on timestamp) in the blockchain. In some embodiments, a block reference value in a block header may be a reference to the block header of the most recently added block prior to the respective block.

In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In an exemplary embodiment, each block can include a block header and one or more transaction values associated with an identification request 105 transmitted by a sending blockchain 120, such that the sending blockchain 120 (e.g., Blockchain A) forms a part of the sending blockchain network 110.

In an exemplary embodiment, the identification request 105 can include information of a receiving blockchain that has to be identified. For example, if it's a financial institution based blockchain, the identification request 105 can include: zip code information, which can provide geographical/location information of a receiving blockchain, including its zip code; pricing information, which can provide information regarding the costs/fee etc. charged by a receiving blockchain for various transactions; foreign exchange (fx) information, which can provide any exchange rate related information charged by a receiving blockchain; and Unique identifier information of the receiving blockchain, for example, International Bank Account Number (IBAN) for a bank based blockchain.

If the blockchain is a cryptocurrency based blockchain, the identification request 105 can include information regarding mining, transaction fees, exchange fees, initial coin offerings etc. If the blockchain is a smart contract based blockchain, the identification request 105 can include information regarding enforcement, tracking, tampering, expiry date, etc.

The identification request 105 can also include prior communication information between a sending blockchain and a receiving blockchain, which can include the type of communication, nature of the communication, frequency of the communication, and/or substance of the communication. The one or more transaction values of the identification request 105 can include the aforementioned information.

In an exemplary embodiment, the system 100 can include a directory service node 130 configured to receive the identification request 105 from the sending blockchain 120, and identify a receiving blockchain 140 (e.g., Blockchain B), which forms part of a receiving blockchain network 150.

In an exemplary embodiment, the directory service node 130 can be configured to identify the receiving blockchain 140 by applying one or more machine learning algorithms on the identification request. Machine learning, as used herein, can be one or more algorithms, or combinations thereof, to effectively perform a specific task without using explicit instructions, relying on patterns and inference instead. For example, one or more of the classification, learning, clustering, neural networks, reinforcement learning, supervised learning algorithms etc.

In an exemplary embodiment, a support vector machine (SVM) can be used as a machine learning technique to identify the receiving blockchain 140 based on the identification request 105. Various methods can be used for training and building the SVM. One such method is described in U.S. Pat. No. 6,327,581, which is incorporated in its entirety by reference. The inputs applied to the SVM can include one or more aspects of the identification request such as zip code, pricing, fx, unique identifier and/or prior communication information, as previously described.

In an exemplary embodiment, the SVM can use zip code information as one of the inputs to classify receiving blockchains (e.g., 140) based on their location with respect to the sending blockchain 120. Similarly, the SVM can use pricing information, fx information to classify receiving blockchains based on their cost effectiveness for various transactions. These are just a few examples; of course the SVM can also use other/all the inputs to classify receiving blockchains based on different aspects. The directory service node 130 can then identify the receiving blockchain 140 based on the classification.

For example, if the classification by SVM identifies a receiving blockchain within a limited range of zip code of the sending blockchain, then the directory service node 130 can identify that as the receiving blockchain 140. Similarly, if the classification by SVM identifies multiple receiving blockchains within a given distance of the sending blockchain, then the directory service node 130 can identify the multiple receiving blockchains as potential receiving blockchains. In such a scenario, to select only one of the potential receiving blockchains, the directory service node 130 can apply SVM techniques (or other machine learning techniques) to the potential multiple receiving blockchains based on some other input (other than zip code information) to identify the receiving blockchain 140. For example, directory service node 130 can apply SVM techniques based on fx fee inputs to classify the potential multiple blockchains to identify the receiving blockchain 140. Alternately, the directory service node 130 can identify the receiving blockchain 140 based on its unique identifier.

In an exemplary embodiment, an artificial neural network can be used to identify the receiving blockchain 140 based on the identification request 105. Various methods can be used for training and building the artificial neural network. One such method is described in the article "A Step by Step Backpropagation Example" by Matt Mazur, available at https://mattmazur.com/2015/03/17/a-step-by-step-back-propagation-example/. This article is incorporated in its entirety by reference.

In this referenced article, the weights and biases assigned to various inputs can be based on preferences of the sending blockchain 120. For example, if the sending blockchain 120 prefers a receiving blockchain with which it has had prior communication, then a higher weight can be assigned to the prior communication information. As the training proceeds, weights and biases for each node of the neural network can be adjusted based on the backpropagation.

In an exemplary embodiment, an identity service node 160 configured to receive a trust request 115 from the directory service node 130 to determine whether a valid trust certificate is available for the receiving blockchain 140, and enable communication 125 between the sending blockchain 120 and the receiving blockchain 140, when the valid trust certificate is determined to be available.

A trust certificate, as used herein, can provide an indication of the trustworthiness of the receiving blockchain 140. Factors that affect the trustworthiness can be multi-faceted including prior performance, reputation, network, security details, etc. A trust certificate for a blockchain can be valid at a given point of time if the blockchain is determined to trustworthy in a given context at that time. The trust certificate can be revoked later in time.

In an exemplary embodiment, once communication 125 is enabled between the sending blockchain 120 and the receiving blockchain 140, continuous data exchange between the sending blockchain 120 and receiving blockchain 140 in their respective blockchain networks can occur without a re-verification of the valid trust certificate. Alternately, a re-verification can take place after a given period of time (e.g., every alternate day etc.)

In various exemplary embodiments, the sending blockchain network 110 can include multiple blockchains (e.g., blockchains 120, 135 etc.). The receiving blockchain network 150 can include multiple blockchains (e.g., blockchain 140, 145 etc.). The directory service node 130 can form a part of the sending blockchain network 110, or can be external (not shown) to the sending blockchain network 110. Similarly, the identity service node 160 can form a part of the sending blockchain network 110, or can be external (not shown) to the sending blockchain network 110.

In an exemplary embodiment, the receiving blockchain network 150 can also include a directory service node 155 and an identity service node 165, with similar functionalities as discussed with respect to 130 and 160 respectively, of the sending blockchain network 110.

Figure 2:
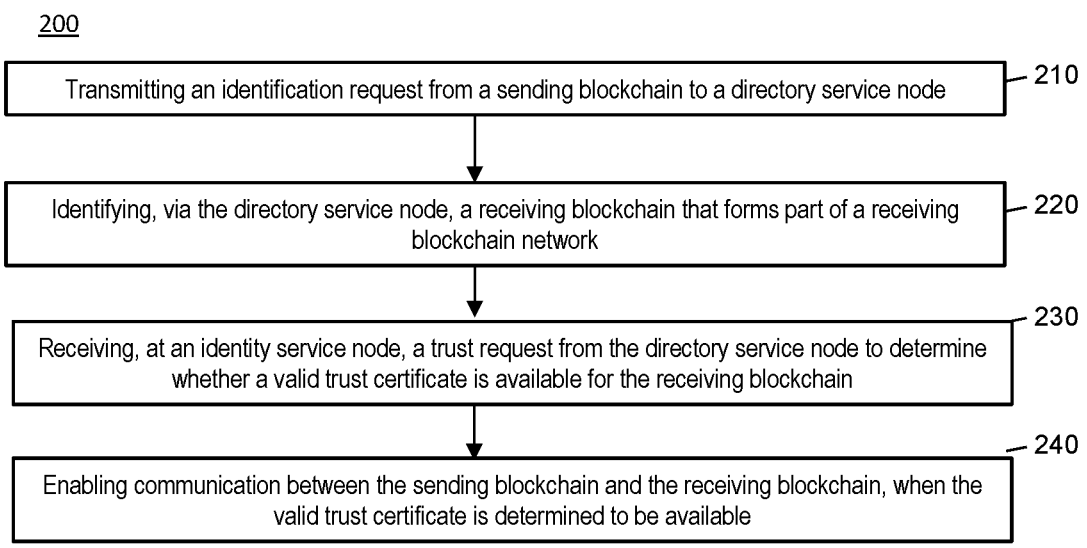
FIG. 2 illustrates a method for enabling communication between blockchains on heterogeneous blockchain networks in accordance with exemplary embodiments.

FIG. 2 illustrates an exemplary method 200, which can be executed in the system 100 for enabling communication between blockchains on heterogeneous blockchain networks. The method 200 can include a step 210 of transmitting an identification request (e.g., 105) from a sending blockchain (e.g., 120) to a directory service node (e.g., 130), as previously described with respect to the system 100. The sending blockchain can form a part of a sending blockchain network (e.g., 110), the blockchain being comprised of a plurality of blocks, each block including a block header and one or more transaction values associated with the identification request.

The method 200 can include a step 220 of identifying, via the directory service node, a receiving blockchain (e.g., 140) that forms part of a receiving blockchain network (e.g., 150), as previously described with respect to the system 100. The method 200 can include a step 230 of receiving, at an identity service node (e.g., 160), a trust request from the directory service node to determine whether a valid trust certificate is available for the receiving blockchain, as previously described with respect to the system 100.

The method 200 can include a step 240 of enabling communication (e.g., 125) between the sending blockchain and the receiving blockchain, when the valid trust certificate is determined to be available, as previously described with respect to system 100.

Exemplary aspects of the method 200 can be similar to the previously described system 100. After enabling the communication as described in system 100 and method 300, the communication 125 can be performed as described in the subsequent sections.

Figure 3:
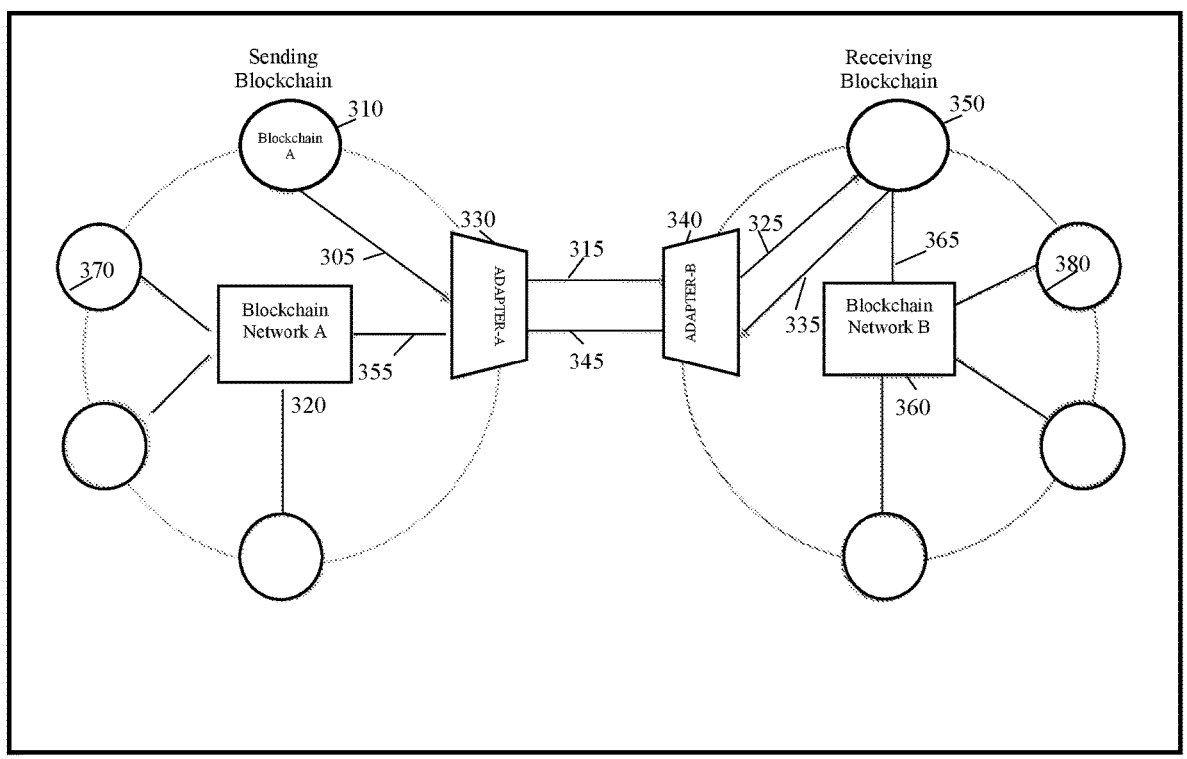
FIG. 3 illustrates a system for communication between blockchains on heterogeneous blockchain networks in accordance with exemplary embodiments.

System and Method for Communicating Between Blockchains on Heterogeneous Blockchain Networks FIG. 3 shows an exemplary system 300 for communicating between blockchains on heterogeneous blockchain networks. The system 300 can include a sending blockchain 310 configured to transmit a first message 305 via a sending blockchain protocol, such that the sending blockchain 310 is comprised of a plurality of blocks, each block including a block header and one or more transaction values associated with the first message 305, and the sending blockchain 310 forms a part of a sending blockchain network 320 (e.g., Blockchain A).

A protocol (e.g., the sending blockchain protocol), as used herein, can relate to any rules, syntax, semantics and synchronization of communication between components of a messaging system. Protocols may be implemented by hardware, software, or a combination of both.

Protocols may specify rules governing the communication. For example, rules regarding data formats and address formats for data exchange, address mapping, routing, detection of transmission errors, acknowledgments, information loss, sequence control, and flow control, etc.

Protocols may include, but are not limited to, one or more of the following: Transmission Control Protocol (TCP) and the User Datagram Protocol (UDP) based protocols, automation protocols (e.g., Ethernet), Bluetooth (e.g., BNEP), file transfer protocols, instant messaging protocols (e.g., BitMessage), link aggregation protocols (e.g., Nortel), OSI protocols (e.g., 802.11 Wi-Fi), routing protocols (e.g., IPv4, IPv6), web services protocols (e.g., json).

In an exemplary embodiment, the system 300 can include a sending adapter node 330 (e.g., Adapter-A) configured to receive the first message 305 (in the sending blockchain protocol) from the sending blockchain 310, and convert the first message 305 from the sending blockchain protocol to an adapter protocol.

In an exemplary embodiment, the general architecture of an adapter node (e.g., 330) can include an internal master protocol communicating to external slave devices and the data collected being used to update the internal database of the adapter. When the external master requests for data, the internal slave can collect data from the database and send it to the external master. There can be different schemes for handling the spontaneous reporting of events and commands. There can be different physical medium for communication on protocol-X & Y, which include RS-232, RS-485, Ethernet, etc.

The conversion from one protocol to another, as disclosed herein, can be via known techniques. An exemplary technique for converting from one protocol to another protocol is described in U.S. Pat. No. 7,966,012, incorporated herein by reference. Similarly, other exemplary techniques can be used for protocol conversion, as described in U.S. Pat. Nos. 6,070,196 and 6,208,904, both of which are incorporated herein by reference.

In an exemplary embodiment, the system 300 can include a receiving adapter node 340 (e.g., adapter B) configured to receive the first message 315 (in the adapter protocol) from the sending adapter node 330, and convert the first message 315 from the adapter protocol to a receiving blockchain protocol. The system can also include a receiving blockchain 350 configured to receive the first message 325 (in the receiving blockchain protocol) from the receiving adapter node 340, and validate the first message 325, such that the receiving blockchain 350 forms a part of the receiving blockchain network 360.

Validation of a message (e.g., 325), as used herein, can be provide certain well-defined guarantees for fitness, accuracy, and consistency for any type data into an application or automated system. Data validation rules can be defined and designed using any of various methodologies, and be deployed in any of various contexts. For example, U.S. Pat. Nos. 7,594,033, 7,512,711, 6,732,175, 6,732,175, and 7,146, 422 describe several methodologies for data validation, all of which are incorporated herein by reference.

In an exemplary embodiment, the receiving blockchain 350 can be configured to transmit a second message 335 to the receiving adapter node 340 via the receiving blockchain protocol. The receiving adapter node 340 can be configured to convert the second message 335 from the receiving blockchain protocol to the adapter protocol, and transmit the second message 345 to the sending adapter node 330.

In an exemplary embodiment, the first message can be a payment request for a transaction between the sending blockchain 310 and the receiving blockchain 350. The second message can be a payment accepted acknowledgment for a transaction between the sending blockchain 310 and the receiving blockchain 350.

In an exemplary embodiment, the sending adapter node 330 can be configured to convert the second message 345 from the adapter protocol to a sending blockchain protocol. The sending adapter node 330 can be further configured hash the second message 345 (in the sending blockchain protocol), and store the hashed second message 355 in the sending blockchain network 320.

Hashing, as used herein, can include a function that can be used to map data of any size to a fixed size. Any known design can be used for hashing. For example, a Merkle-Damgård construction (e.g., MD5) can be used for hashing. This can be achieved by breaking the input (the second message 345) into a series of equal-sized blocks, and operating on them in sequence using a one-way compression function. The compression function can either be specially designed for hashing or be built from a block cipher. An exemplary hashing technique is also described in U.S. Pat. No. 5,612,865, which is incorporated by reference.

In an exemplary embodiment, the receiving blockchain 350 can be configured to hash the validated first message 325 (in the receiving blockchain protocol), and store the hashed first message 365 in the receiving blockchain network 360.

In an exemplary embodiment, the sending adapter node 330 can form a part of the sending blockchain network 320, or can be external (not shown) to the sending blockchain network 320. Similarly, the receiving adapter node 340 can form a part of the receiving blockchain network 360, or can be external (not shown) to the receiving blockchain network 360.

In an exemplary embodiment, the sending blockchain network 320 can include multiple blockchains (e.g., 310, 370). Similarly, the receiving blockchain network 360 can also include multiple blockchains (e.g., 350, 380).

Figure 4:
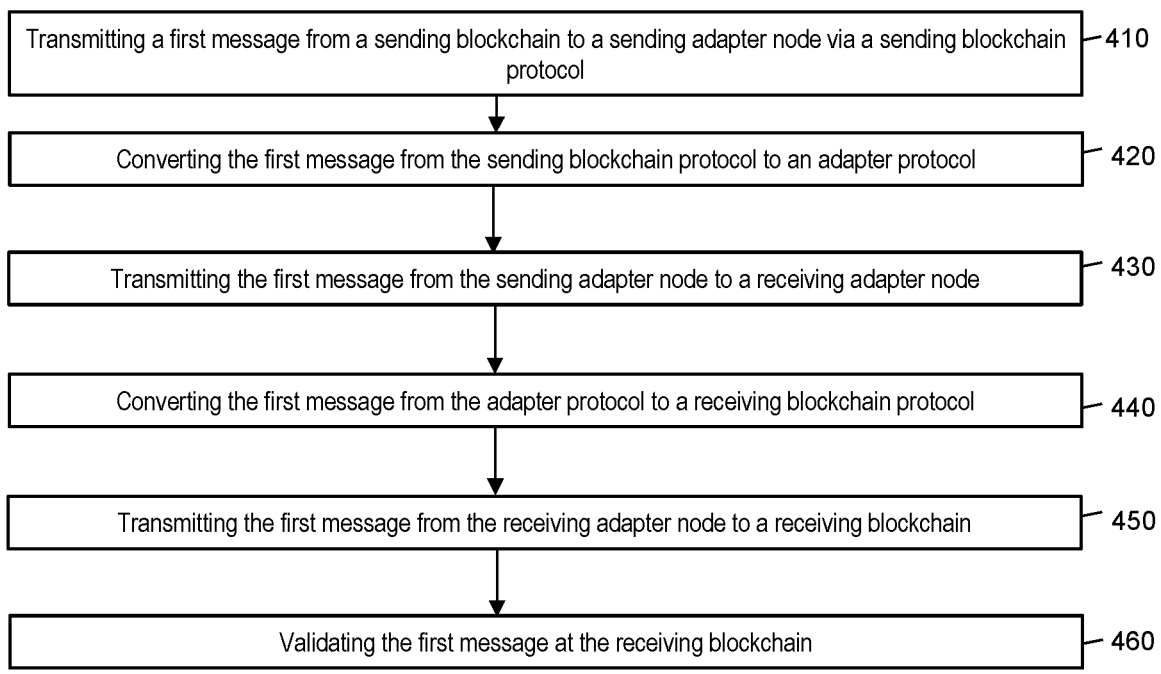
FIG. 4 illustrates a method for communication between blockchains on heterogeneous blockchain networks in accordance with exemplary embodiments.

FIG. 4 illustrates an exemplary method 400, which can be executed in the system 300 for communication between blockchains on heterogeneous blockchain networks. The method 400 can include a step 410 of transmitting a first message (e.g., 305) from a sending blockchain (e.g., 310) to a sending adapter node (e.g., 330) via a sending blockchain protocol, as previously described with respect to the system 300.

The sending blockchain can be comprised of a plurality of blocks, each block including a block header and one or more transaction values associated with the first message, and the sending blockchain can form a part of a sending blockchain network (e.g., 110).

The method 400 can include a step 420 of converting the first message, via the sending adapter node, from the sending blockchain protocol to an adapter protocol. The method 400 can include a step 430 of transmitting the first message from the sending adapter node to a receiving adapter node (e.g., 340), as previously described with respect to the system 300.

The method 400 can include a step 440 of converting the first message, via the receiving adapter node, from the adapter protocol to a receiving blockchain protocol. The method 400 can include a step 450 of transmitting the first message from the receiving adapter node to a receiving blockchain (e.g., 360), which can form a part of the receiving blockchain network, as previously described with respect to system 300.

The method 400 can include a step 460 of validating the first message at the receiving blockchain, as previously described with respect to system 300. Other exemplary aspects of the method 400 can be similar to the previously described system 300.

Various exemplary embodiments/aspects of the aforementioned system 100 and 300, and method 200 and 400 can be implemented using a computer system, using hardware, software, firmware, non-transitory computer readable media having instructions stored thereon, or a combination thereof and may be implemented in one or more computer systems or other processing systems. Details of an exemplary computer system 500 are described as follows.

Computer System Architecture

Figure 5:
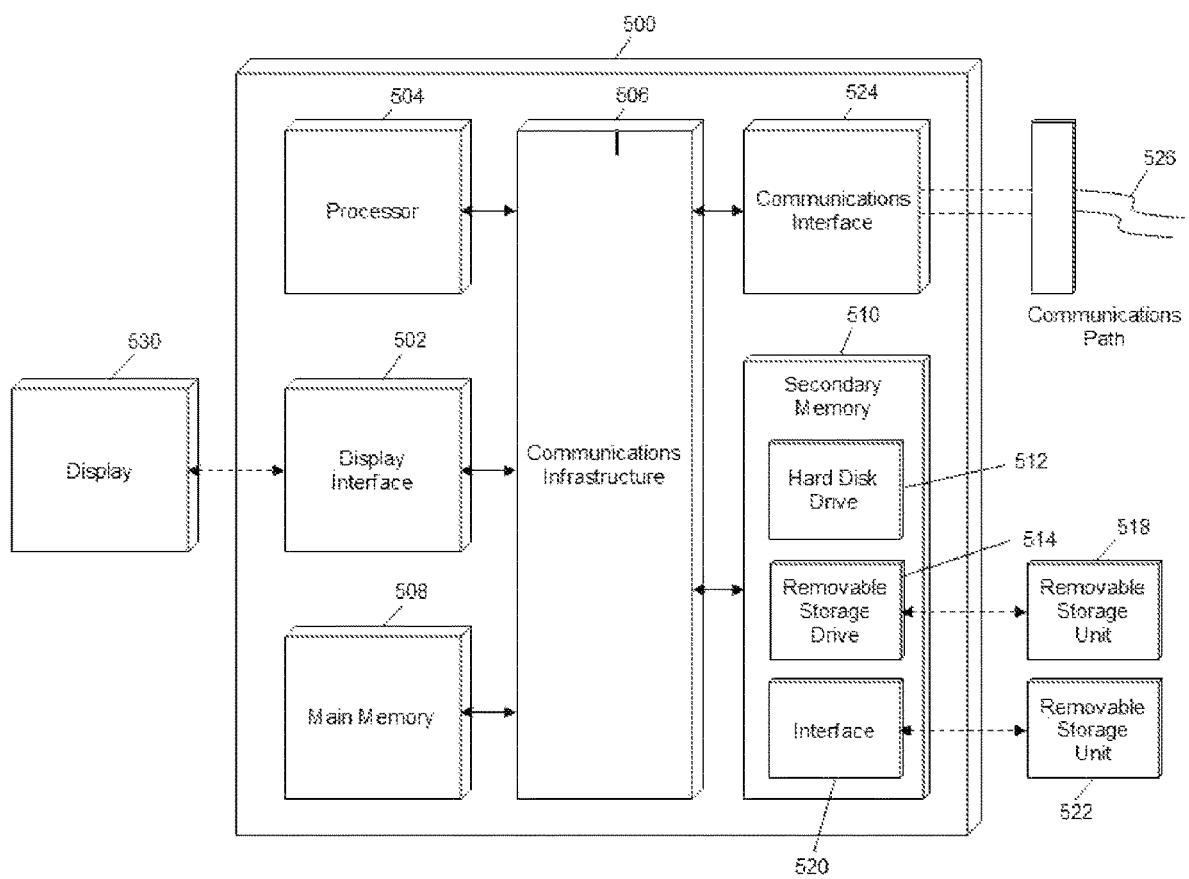
FIG. 5 is a block diagram illustrating computer system architecture in accordance with exemplary embodiments.

FIG. 5 illustrates the computer system 500 in which embodiments of the present disclosure, or portions thereof, may be implemented as computer-readable code. For example, the system 100 of FIG. 1 and the system 300 of FIG. 3 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this exemplary computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 2 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500.

The process of compiling may include the use of lexical analysis, pre-processing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for enabling and performing communication between blockchains on heterogeneous blockchain networks. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A system for enabling communication between blockchains on heterogeneous blockchain networks, the system comprising:
   a sending blockchain network including a sending blockchain node configured to perform processing and management associated with a sending blockchain;
   a directory service node that forms part of the sending blockchain network, wherein the directory service node is configured to receive an identification request from the sending blockchain node and identify a receiving blockchain associated with a receiving blockchain node included in a receiving blockchain network; and
   an identity service node that forms part of the sending blockchain network, wherein the identity service node is configured to determine whether a valid trust certificate is available for the receiving blockchain based on a trustworthiness of the receiving blockchain, wherein factors that affect said trustworthiness include at least one of prior performance of the receiving blockchain, reputation, and security details, and
   wherein the identity service node is further configured to enable communication between the sending blockchain node in the sending blockchain network and the receiving blockchain node in the receiving blockchain network.

2. The system of claim 1, wherein the directory service node is configured to identify the receiving blockchain by applying one or more machine learning algorithms on the identification request.

3. The system of claim 1, wherein the directory service node is configured to identify the receiving blockchain based on a preference of the sending blockchain.

4. The system of claim 1, wherein the identification request includes one or more of zip code information, pricing information, foreign exchange (fx) information, and unique identifier information of the receiving blockchain.

5. The system of claim 1,
   wherein the identification request includes information regarding prior communication between the sending blockchain and the receiving blockchain.

6. The system of claim 1, wherein the enabled communication allows continuous data exchange between the sending blockchain and receiving blockchain without a re-verification of the valid trust certificate.

7. The system of claim 1, wherein the sending blockchain network includes multiple blockchains.

8. The system of claim 1, wherein the receiving blockchain network includes multiple blockchains.

9. A method for enabling communication between blockchains on heterogeneous blockchain networks, the method comprising:
   transmitting, by a sending blockchain node included in a sending blockchain network, an identification request to a directory service node that forms part of the sending blockchain network, wherein the sending blockchain node is configured to perform processing and management associated with the sending blockchain;
   identifying, via the directory service node that forms part of the sending blockchain network, a receiving blockchain associated with a receiving blockchain node included in a receiving blockchain network; and
   determining, by the identity service node that forms part of the sending blockchain network, whether a valid trust certificate is available for the receiving blockchain based on a trustworthiness of the receiving blockchain, wherein factors that affect said trustworthiness include at least one of prior performance of the receiving blockchain, reputation, and security details; and enabling communication between the sending blockchain node in the sending blockchain network and the receiving blockchain in the receiving blockchain network.

10. The method of claim 9, wherein the identifying the receiving blockchain includes applying one or more machine learning algorithms on the identification request.

11. The method of claim 9, wherein the identifying the receiving blockchain is based on a preference of the sending blockchain.

12. The method of claim 9, wherein the identification request includes one or more of zip code information, pricing information, foreign exchange (fx) information, and unique identifier information of the receiving blockchain.

13. The method of claim 9, wherein the identification request includes information regarding prior communication between the sending blockchain and the receiving blockchain.

14. The method of claim 9, wherein the enabling communication includes continuous data exchange between the sending blockchain and receiving blockchain without a re-verification of the valid trust certificate.

15. The method of claim 9, wherein the sending blockchain network includes multiple blockchains.

16. The method of claim 9, wherein the receiving blockchain network includes multiple blockchains.

\* \* \* \* \*